US012191445B2

(12) United States Patent
Nishio et al.

(10) Patent No.: US 12,191,445 B2
(45) Date of Patent: Jan. 7, 2025

(54) LITHIUM-ALUMINUM-FLUORINE-CHLORINE/BROMINE-CONTAINING ELECTROLYTE MATERIAL AND BATTERY INCLUDING THE SAME

(71) Applicant: Panasonic Intellectual Property Management Co., Ltd., Osaka (JP)

(72) Inventors: Yusuke Nishio, Osaka (JP); Akihiro Sakai, Nara (JP); Tetsuya Asano, Nara (JP); Masashi Sakaida, Hyogo (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 657 days.

(21) Appl. No.: 17/388,346

(22) Filed: Jul. 29, 2021

(65) Prior Publication Data

US 2021/0359340 A1   Nov. 18, 2021

Related U.S. Application Data

(63) Continuation of application No. PCT/JP2020/005706, filed on Feb. 14, 2020.

(30) Foreign Application Priority Data

Feb. 28, 2019 (JP) .................. 2019-035514

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
CPC ...................... H01M 10/0562; H01M 10/0525
(Continued)

(56) References Cited

U.S. PATENT DOCUMENTS 4,287,271 A * 9/1981 Coetzer .................. H01M 6/36
429/103
6,730,441 B1 * 5/2004 Hambitzer .......... H01M 10/365
429/231.95
(Continued)

FOREIGN PATENT DOCUMENTS

JP   2003-502830 A   1/2003
JP   2011-129312   6/2011
(Continued)

OTHER PUBLICATIONS

"inequality." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1257883. (Year: 2010).*
(Continued)

*Primary Examiner* — Sean P Cullen
(74) *Attorney, Agent, or Firm* — Rimon P.C.

(57) ABSTRACT

An electrolyte material is represented by $Li_{4-3a-cb}Al_aM_bF_xCl_yBr_{4-x-y}$, wherein M is at least one selected from the group consisting of Mg, Ca, and Zr; c represents a valence of M; and the following five inequalities are satisfied: $0<a<1.33$, $0\le b<2$, $0<x<4$, $0\le y<4$, and $(x+y)\le 4$.

10 Claims, 3 Drawing Sheets

(58) Field of Classification Search
USPC .................................... 429/319, 322, 323
See application file for complete search history.

(56) References Cited

U.S. PATENT DOCUMENTS

| | | | |
|---|---|---|---|
| 2010/0143769 A1* | 6/2010 | Lee ................... | H01M 10/056 |
| | | | 429/231.95 |
| 2012/0094186 A1 | 4/2012 | Chu et al. | |
| 2012/0301796 A1 | 11/2012 | Ohtomo et al. | |
| 2015/0064578 A1* | 3/2015 | Kang ................ | H01M 10/0567 |
| | | | 429/188 |
| 2018/0062200 A1* | 3/2018 | Yamamoto ............ | C04B 35/488 |

FOREIGN PATENT DOCUMENTS

| | | |
|---|---|---|
| JP | 2017-139142 A | 8/2017 |
| KR | 10-2012-039447 A | 4/2012 |

OTHER PUBLICATIONS

International Search Report of PCT application No. PCT/JP2020/005706 dated Apr. 21, 2020.
E. J. Plichta et al., "The Rechargeable LixTiS2/LiAlCl4/Li1-xCoO2 Solid-State Cell", J. Electrochem. Soc., vol. 139, No. 6, Jun. 1992, 1509-1513.
W. Weppner et al., "Ionic Conductivity of Solid and Liquid LiAlCl4", J. Electrochem. Soc., vol. 124, No. 1, Jan. 1977, 35-38.
The Indian OA dated Sep. 26, 2023 for the related Indian Patent Application No. 202147036063.

* cited by examiner

LITHIUM-ALUMINUM-FLUORINE-CHLORINE/BROMINE-CONTAINING ELECTROLYTE MATERIAL AND BATTERY INCLUDING THE SAME

BACKGROUND

1. Technical Field

The present disclosure relates to electrolyte materials and batteries including electrolyte materials.

2. Description of the Related Art

Japanese Unexamined Patent Application Publication No. 2011-129312 discloses an all-solid battery including a sulfide solid electrolyte. J. Electrochem. SOC. 35, 124 (1977) and J. Electrochem. SOC. 1509,139 (1992) disclose batteries including $LiAlCl_4$.

SUMMARY

One non-limiting and exemplary embodiment provides an electrolyte material with high lithium ion conductivity.

In one general aspect, the techniques disclosed here feature an electrolyte material represented by the following compositional formula (1):

$$Li_{4-3a-cb}Al_aM_bF_xCl_yBr_{4-x-y} \qquad (1)$$

wherein M is at least one selected from the group consisting of Mg, Ca, and Zr; c represents a valence of M; and the following five inequalities are satisfied: $0<a<1.33$, $0\leq b<2$, $0<x<4$, $0\leq y<4$, and $(x+y)\leq 4$.

The present disclosure provides an electrolyte material with high lithium ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
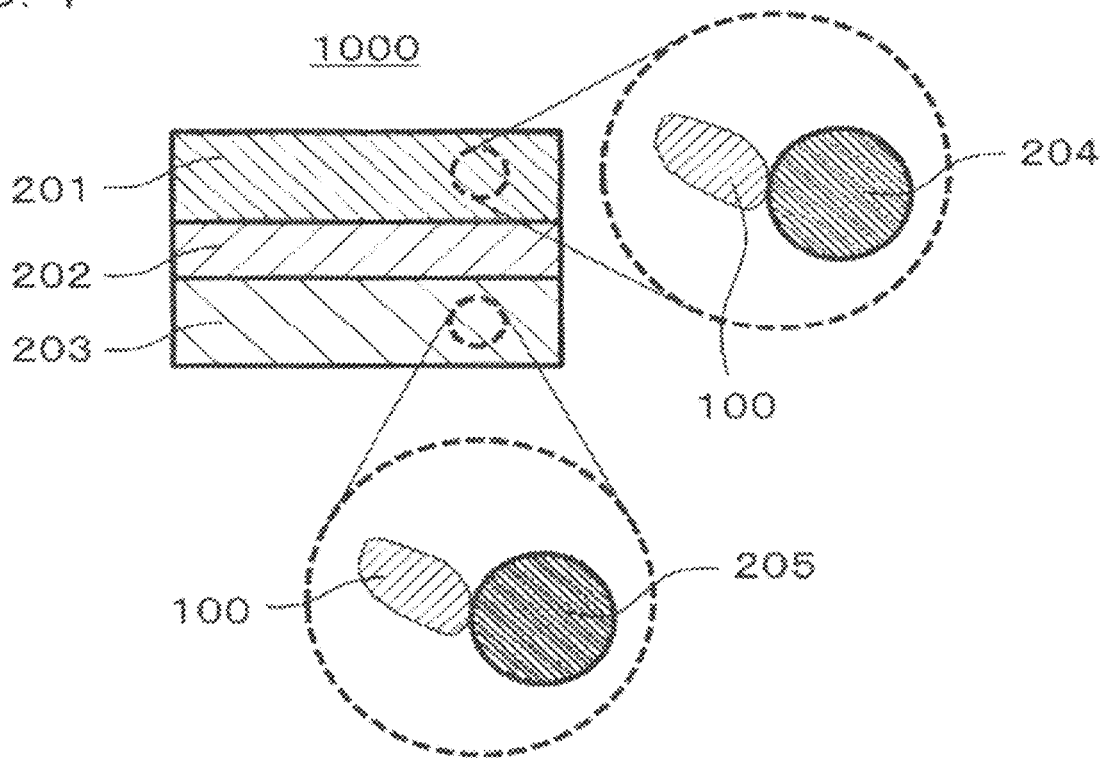
FIG. 1 illustrates a sectional view of a battery 1000 according to a second embodiment.

Embodiments of the present disclosure will be described below with reference to the drawings.

First Embodiment

An electrolyte material according to a first embodiment is a material represented by the following compositional formula (1):

$$Li_{4-3a-cb}Al_aM_bF_xCl_yBr_{4-x-y} \qquad (1)$$

wherein M is at least one selected from the group consisting of Mg, Ca, and Zr; c represents a valence of M; and the following five inequalities are satisfied: $0<a<1.33$, $0\leq b<2$, $0<x<4$, $0\leq y<4$, and $(x+y) 4$.

The electrolyte material according to the first embodiment has high lithium ion conductivity.

The electrolyte material according to the first embodiment can be used to provide a battery with superior charge/discharge characteristics. An example of the battery is an all-solid secondary battery.

The electrolyte material according to the first embodiment contains no sulfur and therefore generates no hydrogen sulfide when exposed to air. Thus, the electrolyte material according to the first embodiment offers high safety. Note that the sulfide solid electrolyte disclosed in PTL 1 generates hydrogen sulfide when exposed to air.

To improve the ionic conductivity of the electrolyte material, $0.4\leq x\leq 2.0$ may be satisfied in formula (1). To further improve the ionic conductivity, $0.8\leq x\leq 1.8$ may be satisfied.

To improve the ionic conductivity of the electrolyte material, $1\leq a\leq 1.25$ may be satisfied in formula (1). To further improve the ionic conductivity, $1\leq a\leq 1.2$ may be satisfied.

To improve the ionic conductivity of the electrolyte material, M may be Zr.

To improve the ionic conductivity of the electrolyte material, $b=0$ may be satisfied. That is, the electrolyte material may be a material represented by the following compositional formula (2):

$$Li_{4-3a}Al_aF_xCl_yBr_{4-x-y} \qquad (2)$$

where the following four inequalities are satisfied: $0<a<1.33$, $0<x<4$, $0\leq y<4$, and $(x+y)\leq 4$.

The electrolyte material according to the first embodiment may be crystalline or amorphous.

The shape of the electrolyte material according to the first embodiment is not limited. The shape of the electrolyte material according to the first embodiment may be, for example, acicular, spherical, or ellipsoidal. For example, the electrolyte material according to the first embodiment may be in particle form. The electrolyte material according to the first embodiment may be formed in the shape of a pellet or a plate.

For example, if the shape of the electrolyte material according to the first embodiment is in particle form (e.g., spherical), the electrolyte material may have a median size of greater than or equal to 0.1 μm and less than or equal to 100 μm. The electrolyte material according to the first embodiment may have a median size of greater than or equal to 0.5 μm and less than or equal to 10 μm. This allows the electrolyte material to have a higher ionic conductivity. In addition, the electrolyte material can form a well-dispersed state with other materials such as active materials.

Method for Manufacturing Electrolyte Material

The electrolyte material according to the first embodiment is manufactured, for example, by the following method.

Halide raw material powders are mixed together so as to obtain the target composition. As one example, if the target composition is $LiAlF_{1.6}Cl_{2.4}$, LiCl, $AlCl_3$, and $AlF_3$ are mixed together in a $LiCl:AlCl_3:AlF_3$ molar ratio of about 1.0:0.47:0.53. Alternatively, LiF, $AlCl_3$, and $AlF_3$ may be mixed together in a $LiF:AlCl_3:AlF_3$ molar ratio of about 1.0:0.8:0.2. The raw material powders may be mixed together in a molar ratio adjusted in advance so as to cancel out a change in composition that can occur during the synthesis process.

The raw material powders may be reacted with each other mechanochemically (i.e., by a mechanochemical milling method) in a mixer such as a planetary ball mill to obtain a reaction product. Alternatively, a mixture of the raw material powders may be heat-treated in a vacuum or in an inert atmosphere (e.g., in an argon atmosphere or a nitrogen atmosphere) to obtain a reaction product.

By such methods, the electrolyte material according to the first embodiment can be obtained.

Second Embodiment

A second embodiment of the present disclosure will be described below. The details described in the first embodiment are omitted where appropriate.

A battery according to the second embodiment includes a positive electrode, an electrolyte layer, and a negative electrode. The electrolyte layer is disposed between the positive electrode and the negative electrode.

At least one selected from the group consisting of the positive electrode, the electrolyte layer, and the negative electrode contains the electrolyte material according to the first embodiment.

The battery according to the second embodiment contains the electrolyte material according to the first embodiment and thus has superior charge/discharge characteristics.

FIG. 1 illustrates a sectional view of a battery 1000 according to the second embodiment.

The battery 1000 according to the second embodiment includes a positive electrode 201, an electrolyte layer 202, and a negative electrode 203. The electrolyte layer 202 is disposed between the positive electrode 201 and the negative electrode 203.

The positive electrode 201 contains positive electrode active material particles 204 and electrolyte particles 100.

The electrolyte layer 202 contains an electrolyte material (e.g., a solid electrolyte material).

The negative electrode 203 contains negative electrode active material particles 205 and the electrolyte particles 100.

The electrolyte particles 100 are particles consisting of the electrolyte material according to the first embodiment or are particles containing the electrolyte material according to the first embodiment as a main component. "Particles containing the electrolyte material according to the first embodiment as a main component" refers to particles in which the component present in the largest amount is the electrolyte material according to the first embodiment.

The positive electrode 201 contains a material capable of occluding and releasing metal ions (e.g., lithium ions). The positive electrode 201 contains, for example, a positive electrode active material (e.g., the positive electrode active material particles 204).

Examples of positive electrode active materials include lithium-containing transition metal oxides, transition metal fluorides, polyanionic materials, fluorinated polyanionic materials, transition metal sulfides, transition metal oxyfluorides, transition metal oxysulfides, and transition metal oxynitrides. Examples of lithium-containing transition metal oxides include $Li(NiCoAl)O_2$ and $LiCoO_2$.

The positive electrode active material particles 204 may have a median size of greater than or equal to 0.1 µm and less than or equal to 100 µm. If the positive electrode active material particles 204 have a median size of greater than or equal to 0.1 µm, the positive electrode active material particles 204 and the electrolyte particles 100 can be well dispersed in the positive electrode. This improves the charge/discharge characteristics of the battery. If the positive electrode active material particles 204 have a median size of less than or equal to 100 µm, the diffusion speed of lithium in the positive electrode active material particles 204 is improved. This allows the battery to operate at high output power.

The positive electrode active material particles 204 may have a larger median size than the electrolyte particles 100. This allows the positive electrode active material particles 204 and the electrolyte particles 100 to be well dispersed.

From the viewpoint of the energy density and output power of the battery, the ratio of the volume of the positive electrode active material particles 204 to the sum of the volume of the positive electrode active material particles 204 and the volume of the electrolyte particles 100 in the positive electrode 201 may be greater than or equal to 0.30 and less than or equal to 0.95.

From the viewpoint of the energy density and output power of the battery, the positive electrode 201 may have a thickness of greater than or equal to 10 µm and less than or equal to 500 µm.

The electrolyte material present in the electrolyte layer 202 may be the electrolyte material according to the first embodiment.

The electrolyte layer 202 may be a solid electrolyte layer.

The electrolyte layer 202 may be composed only of the electrolyte material according to the first embodiment.

The electrolyte layer 202 may be composed only of an electrolyte material (e.g., a solid electrolyte material) different from the electrolyte material according to the first embodiment. Examples of electrolyte materials different from the electrolyte material according to the first embodiment include $Li_2MgX_4$, $Li_2FeX_4$, $Li(Ga,In)X_4$, $Li_3(Y,Gd,Sm,Al,Ga,In)X_6$, $Li_2ZrX_6$, and LiI, where X is at least one selected from the group consisting of F, Cl, Br, and I.

The electrolyte material according to the first embodiment is hereinafter referred to as "first electrolyte material". The electrolyte material different from the electrolyte material according to the first embodiment is referred to as "second electrolyte material".

The electrolyte layer 202 may contain not only the first electrolyte material, but also the second electrolyte material. The first electrolyte material and the second electrolyte material may be homogeneously dispersed in the electrolyte layer 202.

A layer consisting of the first electrolyte material and a layer consisting of the second electrolyte material may be stacked together in the stacking direction of the battery 1000.

The electrolyte layer 202 may have a thickness of greater than or equal to 1 µm and less than or equal to 100 µm. If the electrolyte layer 202 has a thickness of greater than or equal to 1 µm, the positive electrode 201 and the negative electrode 203 are unlikely to be short-circuited. If the electrolyte layer 202 has a thickness of less than or equal to 100 µm, the battery can operate at high output power.

The negative electrode 203 contains a material capable of occluding and releasing metal ions (e.g., lithium ions). The negative electrode 203 contains, for example, a negative electrode active material (e.g., the negative electrode active material particles 205).

Examples of negative electrode active materials include metal materials, carbon materials, oxides, nitrides, tin compounds, and silicon compounds. Metal materials may be elemental metals or alloys. Examples of metal materials include lithium metal and lithium alloys. Examples of carbon materials include natural graphite, coke, semi-graphitized carbon, carbon fibers, spherical carbon, artificial graphite, and amorphous carbon. Examples of negative electrode active materials suitable from the viewpoint of capacity density include silicon (i.e., Si), tin (i.e., Sn), silicon compounds, and tin compounds.

The negative electrode active material particles 205 may have a median size of greater than or equal to 0.1 μm and less than or equal to 100 μm. If the negative electrode active material particles 205 have a median size of greater than or equal to 0.1 μm, the negative electrode active material particles 205 and the electrolyte particles 100 can be well dispersed in the negative electrode 203. This improves the charge/discharge characteristics of the battery. If the negative electrode active material particles 205 have a median size of less than or equal to 100 μm, the diffusion speed of lithium in the negative electrode active material particles 205 is improved. This allows the battery to operate at high output power.

The negative electrode active material particles 205 may have a larger median size than the electrolyte particles 100. This allows the negative electrode active material particles 205 and the electrolyte particles 100 to be well dispersed.

From the viewpoint of the energy density and output power of the battery, the ratio of the volume of the negative electrode active material particles 205 to the sum of the volume of the negative electrode active material particles 205 and the volume of the electrolyte particles 100 in the negative electrode 203 may be greater than or equal to 0.30 and less than or equal to 0.95.

From the viewpoint of the energy density and output power of the battery, the negative electrode 203 may have a thickness of greater than or equal to 10 μm and less than or equal to 500 μm.

To improve the ionic conductivity, the chemical stability, and the electrochemical stability, at least one selected from the group consisting of the positive electrode 201, the electrolyte layer 202, and the negative electrode 203 may contain a second electrolyte material (e.g., a solid electrolyte material).

The second electrolyte material may be a sulfide solid electrolyte.

Examples of sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

The second electrolyte material may be an oxide solid electrolyte.

Examples of oxide solid electrolytes include:
(i) NASICON-type solid electrolytes such as $LiTi_2(PO_4)_3$ and element-substituted derivatives thereof;
(ii) perovskite-type solid electrolytes such as $(LaLi)TiO_3$;
(iii) LISICON-type solid electrolytes such as $Li_{14}ZnGe_4O_{16}$, $Li_4SiO_4$, $LiGeO_4$, and element-substituted derivatives thereof;
(iv) garnet-type solid electrolytes such as $Li_7La_3Zr_2O_{12}$ and element-substituted derivatives thereof; and
(v) $Li_3PO_4$ and N-substituted derivatives thereof.

The second electrolyte material may be a halide solid electrolyte, as mentioned above.

Examples of halide solid electrolytes include $Li_2MgX_4$, $Li_2FeX_4$, $Li(Ga,In)X_4$, $Li_3(Y,Gd,Sm,Al,Ga,In)X_6$, $Li_2ZrX_6$, and LiI, where X is at least one selected from the group consisting of F, Cl, Br, and I.

Another example of a halide solid electrolyte is a compound represented by $Li_pMe_qY_rX'_6$, where $p+mq+3r=6$ and $r>0$ are satisfied; Me is at least one selected from the group consisting of metal elements other than Li and Y and metalloid elements; and m represents the valence of Me. "Metalloid element" refers to B, Si, Ge, As, Sb, and Te. "Metal element" encompasses all elements in groups 1 to 12 of the periodic table (except hydrogen) and all elements in groups 13 to 16 of the periodic table (except B, Si, Ge, As, Sb, Te, C, N, P, O, S, and Se).

From the viewpoint of ionic conductivity, Me may be at least one selected from the group consisting of Mg, Ca, Sr, Ba, Zn, Sc, Al, Ga, Bi, Zr, Hf, Ti, Sn, Ta, and Nb. The halide solid electrolyte may be, for example, $Li_3YCl_6$ or $Li_3YBr_6$.

The second electrolyte material may be an organic polymer solid electrolyte.

An example of an organic polymer solid electrolyte is a compound of a polymer compound with a lithium salt. The polymer compound may have an ethylene oxide structure. A polymer compound having an ethylene oxide structure can contain a large amount of lithium salt and can therefore further improve the ionic conductivity.

Examples of lithium salts include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. As the lithium salt, the electrolyte material according to the first embodiment may be used. One lithium salt selected from the lithium salts presented by way of example may be used alone. Alternatively, a mixture of two or more lithium salts selected from the lithium salts presented by way of example may be used.

To facilitate transfer of lithium ions and thereby improve the output power characteristics of the battery, at least one selected from the group consisting of the positive electrode 201, the electrolyte layer 202, and the negative electrode 203 may contain a nonaqueous electrolyte solution, a gel electrolyte, or an ionic liquid.

The nonaqueous electrolyte solution contains a nonaqueous solvent and a lithium salt dissolved in the nonaqueous solvent.

Examples of nonaqueous solvents include cyclic carbonate solvents, linear carbonate solvents, cyclic ether solvents, linear ether solvents, cyclic ester solvents, linear ester solvents, and fluorinated solvents. Examples of cyclic carbonate solvents include ethylene carbonate, propylene carbonate, and butylene carbonate. Examples of linear carbonate solvents include dimethyl carbonate, ethyl methyl carbonate, and diethyl carbonate. Examples of cyclic ether solvents include tetrahydrofuran, 1,4-dioxane, and 1,3-dioxolane. Examples of linear ether solvents include 1,2-dimethoxyethane and 1,2-diethoxyethane. Examples of cyclic ester solvents include γ-butyrolactone. Examples of linear ester solvents include methyl acetate. Examples of fluorinated solvents include fluoroethylene carbonate, methyl fluoropropionate, fluorobenzene, fluoroethyl methyl carbonate, and fluorodimethylene carbonate. One nonaqueous solvent selected from these may be used alone. Alternatively, a combination of two or more nonaqueous solvents selected from these may be used.

Examples of lithium salts include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. As the lithium salt, the electrolyte material according to the first embodiment may be used. One lithium salt selected from the lithium salts presented by way of example may be used alone. Alternatively, a mixture of two or more lithium salts selected from the lithium salts presented by way of example may be used. The concentration of the lithium salt is, for example, greater than or equal to 0.5 mol/L and less than or equal to 2 mol/L.

The electrolyte layer 202 of the battery according to the second embodiment may contain a nonaqueous electrolyte solution containing the electrolyte material according to the first embodiment. That is, the nonaqueous electrolyte solution present in the electrolyte layer 202 may contain a nonaqueous solvent and the electrolyte material according to the first embodiment, which is dissolved in the nonaqueous solvent. Such a battery has high oxidation resistance.

As the gel electrolyte, a polymer material impregnated with a nonaqueous electrolyte solution can be used. Examples of polymer materials include polyethylene oxide, polyacrylonitrile, polyvinylidene fluoride, polymethyl methacrylate, and polymers having an ethylene oxide bond.

Examples of cations present in ionic liquids include:
(i) aliphatic linear quaternary salts such as tetraalkylammoniums and tetraalkylphosphoniums;
(ii) aliphatic cyclic ammoniums such as pyrrolidiniums, morpholiniums, imidazoliniums, tetrahydropyrimidiniums, piperaziniums, and piperidiniums; and
(iii) nitrogen-containing heterocyclic aromatic cations such as pyridiniums and imidazoliums.

Examples of anions present in ionic liquids include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)$, and $C(SO_2CF_3)_3^-$.

The ionic liquid may contain a lithium salt. As the lithium salt, the electrolyte material according to the first embodiment may be used.

At least one selected from the group consisting of the positive electrode 201, the electrolyte layer 202, and the negative electrode 203 may contain a binder to improve the adhesion between the particles.

Examples of binders include polyvinylidene fluoride, polytetrafluoroethylene, polyethylene, polypropylene, aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyethersulfone, hexafluoropolypropylene, styrene-butadiene rubber, and carboxymethylcellulose. Copolymers can also be used as the binder. Examples of such binders include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from these may also be used.

At least one selected from the positive electrode 201 and the negative electrode 203 may contain a conductive additive to improve the electronic conductivity.

Examples of conductive additives include:
(i) graphite such as natural graphite and artificial graphite;
(ii) carbon black such as acetylene black and ketjen black KETJENBLACK®;
(iii) conductive fibers such as carbon fibers and metal fibers;
(iv) fluorinated carbon;
(v) metal powders such as aluminum powder;
(vi) conductive whiskers such as zinc oxide whiskers and potassium titanate whiskers;
(vii) conductive metal oxides such as titanium oxide; and
(viii) conductive polymer compounds such as polyaniline, polypyrrole, and polythiophene.

To reduce the cost, the conductive additive in (i) or (ii) above may be used.

The shape of the battery according to the second embodiment may be, for example, coin-shaped, cylindrical, prismatic, sheet-shaped, button-shaped, flat, or stack-shaped.

EXAMPLES

The present disclosure will be more specifically described below with reference to the Examples and the Comparative Examples.

Example 1

Preparation of Electrolyte Material

As the raw material powders, LiCl, $AlCl_3$, and $AlF_3$ were prepared in a LiCl:$AlCl_3$:$AlF_3$ molar ratio of 1.0:0.87:0.13 in an argon atmosphere with a dew point of lower than or equal to −60° C. (hereinafter referred to as "dry argon atmosphere"). These raw material powders were ground and mixed together in a mortar. The resulting mixture was milled in a planetary ball mill at 500 rpm for 15 hours. Thus, an electrolyte material powder of Example 1 was obtained. The electrolyte material of Example 1 had a composition represented by $LiAlF_{0.4}Cl_{3.6}$.

The Li, Al, F, and Cl contents per unit weight of the entire electrolyte material of Example 1 were measured. The Li and Al contents were measured by inductively coupled plasma atomic emission spectroscopy (ICP-AES). The F and Cl contents were measured by ion chromatography. The Li:Al:F:Cl molar ratio was calculated from the measured Li, Al, F, and Cl contents. As a result, the electrolyte material of Example 1 had a Li:Al:F:Cl molar ratio of 1.0:1.0:0.4:3.6.

Evaluation of Ionic Conductivity

Figure 2:
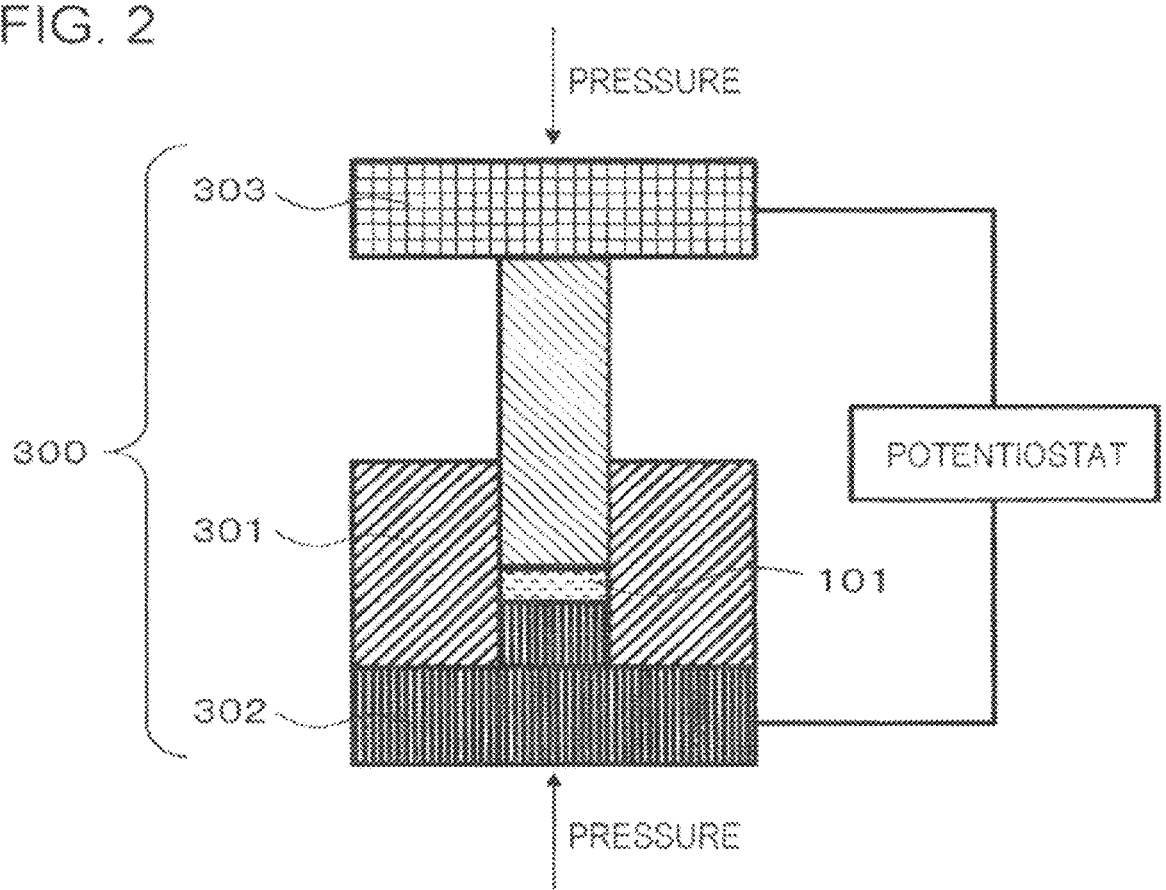
FIG. 2 illustrates a schematic view of a pressure-molding die 300 used to evaluate the ionic conductivity of electrolyte materials.

FIG. 2 illustrates a schematic view of a pressure-molding die 300 used to evaluate the ionic conductivity of electrolyte materials.

The pressure-molding die 300 included a die 301, a lower punch 302, and an upper punch 303. The die 301 was formed of insulating polycarbonate. The lower punch 302 and the upper punch 303 were both formed of electronically conductive stainless steel.

Figure 3:
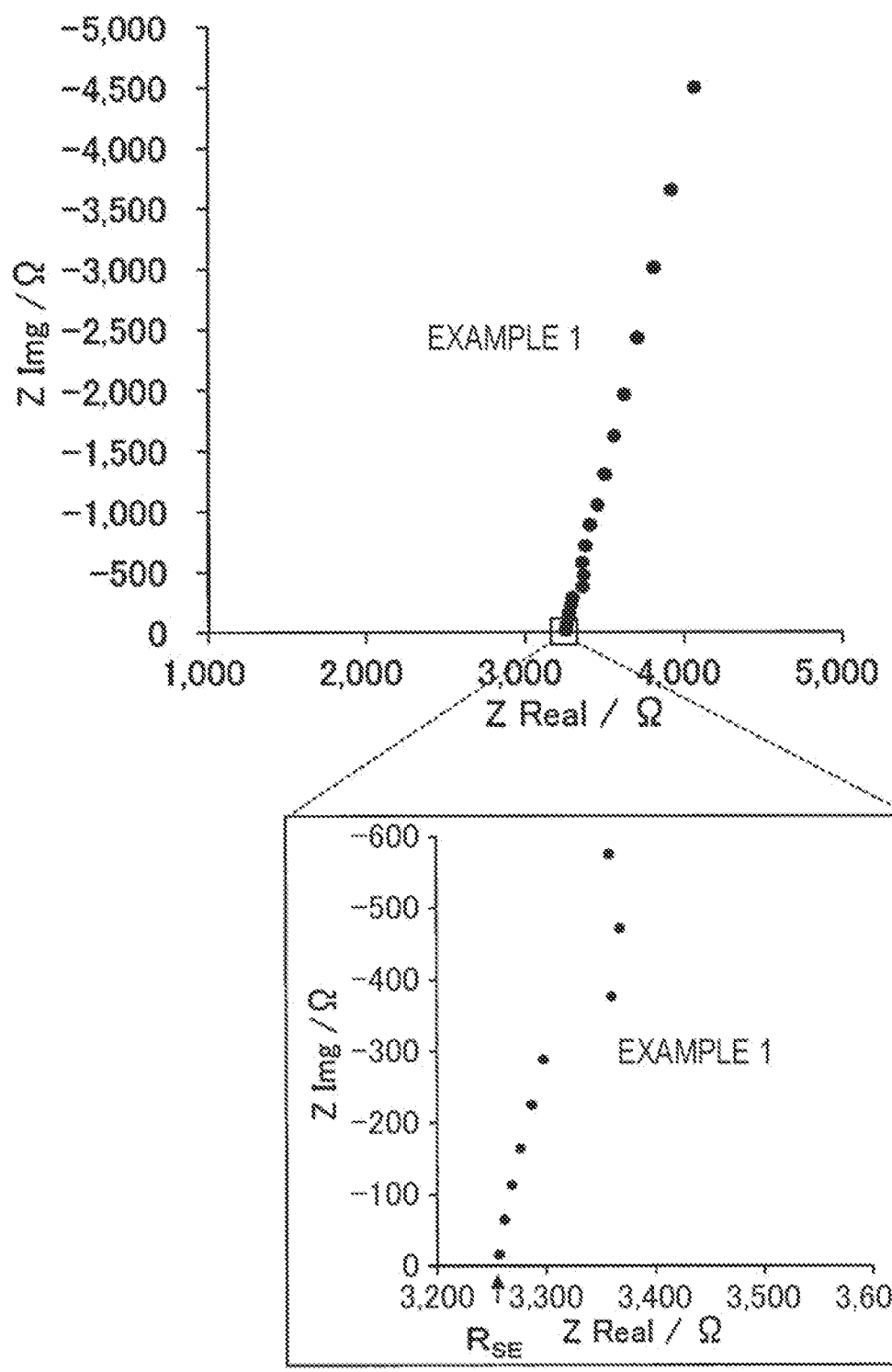
FIG. 3 is a graph of a Cole-Cole plot showing AC impedance measurement results for an electrolyte material of Example 1.

The pressure-molding die 300 illustrated in FIG. 3 was used to measure the ionic conductivity of the electrolyte material of Example 1 by the following method.

An electrolyte material powder 101 of Example 1 was charged into the pressure-molding die 300 in a dry argon atmosphere. A pressure of 400 MPa was applied to the electrolyte material of Example 1 by the lower punch 302 and the upper punch 303.

While the pressure was being applied, the lower punch 302 and the upper punch 303 were connected to a potentiostat (Princeton Applied Research Corporation, VersaSTAT 4) equipped with a frequency response analyzer. The upper punch 303 was connected to a working electrode and a potential measurement terminal. The lower punch 302 was connected to a counter electrode and a reference electrode. The impedance of the electrolyte material of Example 1 was measured at room temperature by electrochemical impedance measurement.

FIG. 3 is a graph of a Cole-Cole plot showing AC impedance measurement results for the electrolyte material of Example 1.

In FIG. 3, the real part of the complex impedance at the measurement point where the absolute value of the phase of the impedance was smallest was assumed to be the resistance of the electrolyte material to ion conduction. For the real part, see the arrow $R_{SE}$ shown in FIG. 3. The resistance was used to calculate the ionic conductivity based on the following equation (2):

$$\sigma = (R_{SE} \times S/t)^{-1} \quad (2)$$

where σ represents the ionic conductivity; S represents the contact area of the electrolyte material with the upper punch 303 (which is equal to the cross-sectional area of the cavity of the die 301 in FIG. 2); $R_{SE}$ represents the resistance of the electrolyte material in the impedance measurement; and t represents the thickness of the electrolyte material (i.e., the thickness of the layer formed from the electrolyte material powder 101 in FIG. 2).

The ionic conductivity of the electrolyte material of Example 1 was measured to be $2.5 \times 10^{-5}$ S/cm at 25° C.

Fabrication of Battery

The electrolyte material of Example 1 and a positive electrode active material, namely, $LiCoO_2$, were prepared in a volume ratio of about 50:50 in a dry argon atmosphere. These materials were mixed together in an agate mortar. Thus, a mixture was obtained.

The electrolyte material of Example 1, the above mixture (9.6 mg), and aluminum powder (14.7 mg) were stacked in that order in an insulating cylinder with an inner diameter of 9.5 mm. A pressure of 300 MPa was applied to the stack to form a solid electrolyte layer and a first electrode. The solid electrolyte layer had a thickness of 700 μm.

Metallic In (with a thickness of 200 μm) was then stacked on the solid electrolyte layer. A pressure of 80 MPa was applied to the stack to form a second electrode. The first electrode was a positive electrode, whereas the second electrode was a negative electrode.

Current collectors formed from stainless steel were then attached to the first electrode and the second electrode, and current collector leads were attached to the current collectors.

Finally, an insulating ferrule was used to isolate the interior of the insulating cylinder from the outside air atmosphere, thereby sealing the interior of the cylinder. Thus, a battery of Example 1 was obtained.

Charge/Discharge Test

Figure 4:
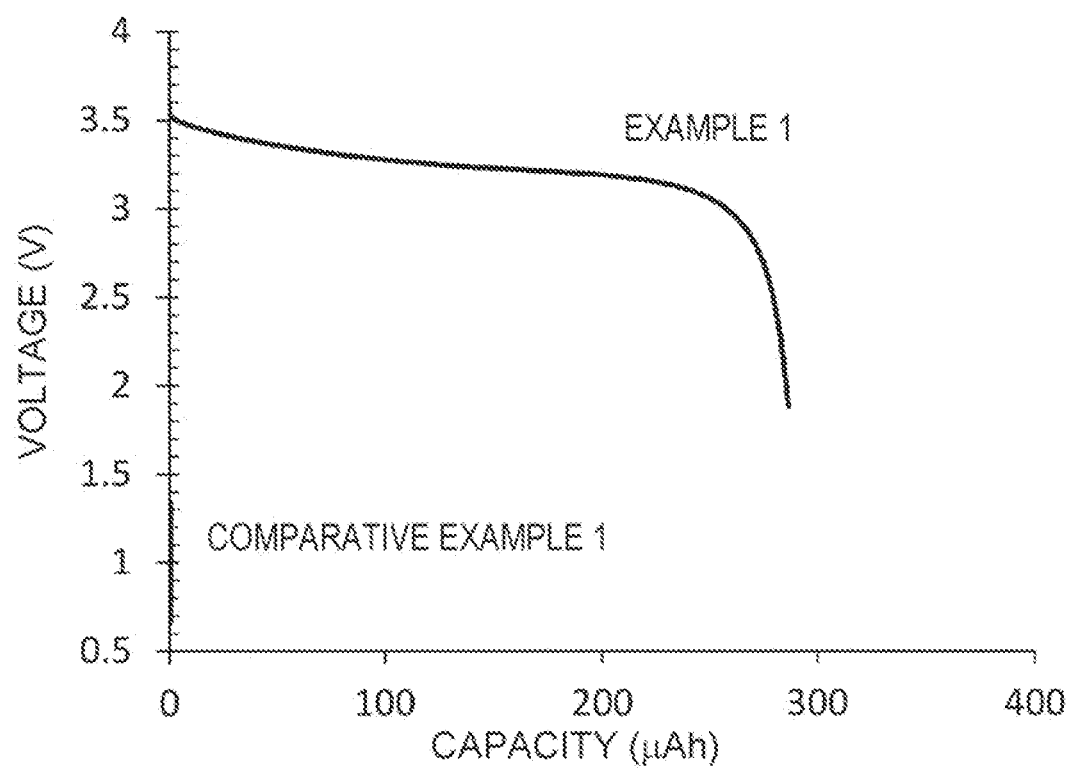
FIG. 4 is a graph showing the initial discharge characteristics of batteries of Example 1 and Comparative Example 1.

FIG. 4 is a graph showing the initial discharge characteristics of the battery of Example 1. The initial charge/discharge characteristics were measured by the following method.

The battery of Example 1 was placed in a constant-temperature chamber at 25° C.

The battery of Example 1 was charged to a voltage of 3.6 V at a current rate of 0.05 C.

The battery of Example 1 was then discharged to a voltage of 1.9 V at the same current rate, i.e., 0.05 C.

As a result of the charge/discharge test, the battery of Example 1 had an initial discharge capacity of 290 μAh.

Examples 2 to 32

In Examples 2 to 24, LiCl, $AlCl_3$, and $AlF_3$ were prepared in a $LiCl:AlCl_3:AlF_3$ molar ratio of $(4-3a):(a-x/3):x/3$ as the raw material powders.

In Examples 25 to 29, LiBr, $AlBr_3$, and $AlF_3$ were prepared in a $LiBrAlBr_3:AlF_3$ molar ratio of $(4-3a):(a-x/3):x/3$ as the raw material powders.

In Examples 30 to 32, LiCl, $AlCl_3$, $AlBr_3$, and $AlF_3$ were prepared in a $LiCl:AlCl_3:AlBr_3:AlF_3$ molar ratio of $(4-3a):\{a+(y-4)/3\}:(4(4-x-y)/3:x/3$ as the raw material powders.

In Examples 4, 6, 8, 15, 16, 18, 20, and 23, the mixtures of the raw material powders were milled in a planetary ball mill and were then heat-treated at 150° C. in a dry argon atmosphere for 30 minutes.

The same procedure as in Example 1 was followed except for the above to obtain electrolyte materials of Examples 2 to 32.

The values of a, b, x, and y for the electrolyte materials of Examples 2 to 32 are shown in Table 1.

The ionic conductivity of the electrolyte materials of Examples 2 to 32 was measured as in Example 1. The measurement results are shown in Table 1.

The same procedure as in Example 1 was followed using the electrolyte materials of Examples 2 to 32 to obtain batteries of Examples 2 to 32. The batteries of Examples 2 to 32 were subjected to a charge/discharge test as in Example 1. As a result, the batteries of Examples 2 to 32 were successfully charged and discharged as in Example 1.

Examples 33 to 50

In Examples 33 to 40, LiCl, $AlCl_3$, $MgCl_2$, and $AlF_3$ were prepared in a $LiCl:AlCl_3:MgCl_2:AlF_3$ molar ratio of $(4-3a-cb):(a-x/3):b:x/3$ as the raw material powders.

In Examples 41 to 46, LiCl, $AlCl_3$, $CaCl_2$, and $AlF_3$ were prepared in a $LiCl:AlCl_3:CaCl_2:AlF_3$ molar ratio of $(4-3a-cb):(a-x/3):b:x/3$ as the raw material powders.

In Examples 47 to 50, LiCl, $AlCl_3$, $ZrCl_4$, and $AlF_3$ were prepared in a $LiCl:AlCl_3:ZrCl_4:AlF_3$ molar ratio of $(4-3a-cb):(a-x/3):b:x/3$ as the raw material powders.

The same procedure as in Example 1 was followed except for the above to obtain electrolyte materials of Examples 33 to 50.

The values of a, b, c, x, and y for the electrolyte materials of Examples 33 to 50 are shown in Table 2.

The ionic conductivity of the electrolyte materials of Examples 33 to 50 was measured as in Example 1. The measurement results are shown in Table 2.

Comparative Examples 1 to 3

In Comparative Example 1, LiCl and $AlCl_3$ were prepared in a $LiCl:AlCl_3$ molar ratio of 1:1 as the raw material powders.

In Comparative Example 2, LiBr and $AlBr_3$ were prepared in a $LiBr:AlBr_3$ molar ratio of 1:1 as the raw material powders.

In Comparative Example 3, LiF and $AlF_3$ were prepared in a $LiF:AlF_3$ molar ratio of 1:1 as the raw material powders.

The same procedure as in Example 1 was followed except for the above to obtain electrolyte materials of Comparative Examples 1 to 3.

The values of a, b, x, and y for the electrolyte materials of Comparative Examples 1 to 3 are shown in Table 3.

The ionic conductivity of the electrolyte materials of Comparative Examples 1 to 3 was measured as in Example 1. The measurement results are shown in Table 3.

The same procedure as in Example 1 was followed using the electrolyte materials of Comparative Examples 1 to 3 to obtain batteries of Comparative Examples 1 to 3. The batteries of Comparative Examples 1 to 3 were subjected to a charge/discharge test as in Example 1. As a result, the batteries of Comparative Examples 1 to 3 had an initial discharge capacity of less than or equal to 1 μAh. The batteries of Comparative Examples 1 to 3 were not charged or discharged.

TABLE 1

|  | Composition | a | b | c | x | y | Heat treatment | Ionic conductivity (S/cm) |
|---|---|---|---|---|---|---|---|---|
| Example 1 | $LiAlF_{0.4}Cl_{3.6}$ | 1 | 0 | — | 0.4 | 3.6 | None | $2.5 \times 10^{-5}$ |
| Example 2 | $LiAlF_{0.8}Cl_{3.2}$ | 1 | 0 | — | 0.8 | 3.2 | None | $5.0 \times 10^{-5}$ |
| Example 3 | $LiAlF_{1.2}Cl_{2.8}$ | 1 | 0 | — | 1.2 | 2.8 | None | $6.7 \times 10^{-5}$ |
| Example 4 | $LiAlF_{1.2}Cl_{2.8}$ | 1 | 0 | — | 1.2 | 2.8 | Performed | $1.5 \times 10^{-4}$ |
| Example 5 | $LiAlF_{1.6}Cl_{2.4}$ | 1 | 0 | — | 1.6 | 2.4 | None | $9.5 \times 10^{-5}$ |
| Example 6 | $LiAlF_{1.6}Cl_{2.4}$ | 1 | 0 | — | 1.6 | 2.4 | Performed | $2.1 \times 10^{-4}$ |
| Example 7 | $LiAlF_{1.64}Cl_{2.36}$ | 1 | 0 | — | 1.64 | 2.36 | None | $9.5 \times 10^{-5}$ |
| Example 8 | $LiAlF_{1.64}Cl_{2.36}$ | 1 | 0 | — | 1.64 | 2.36 | Performed | $1.5 \times 10^{-4}$ |
| Example 9 | $LiAlF_{1.68}Cl_{2.32}$ | 1 | 0 | — | 1.68 | 2.32 | None | $9.5 \times 10^{-5}$ |
| Example 10 | $LiAlF_{1.72}Cl_{2.28}$ | 1 | 0 | — | 1.72 | 2.28 | None | $8.2 \times 10^{-5}$ |
| Example 11 | $LiAlF_{1.76}Cl_{2.24}$ | 1 | 0 | — | 1.76 | 2.24 | None | $6.7 \times 10^{-5}$ |
| Example 12 | $LiAlF_{1.8}Cl_{2.2}$ | 1 | 0 | — | 1.8 | 2.2 | None | $4.5 \times 10^{-5}$ |
| Example 13 | $Li_{0.82}Al_{1.06}F_{1.7}Cl_{2.3}$ | 1.06 | 0 | — | 1.7 | 2.3 | None | $1.0 \times 10^{-4}$ |
| Example 14 | $Li_{0.67}Al_{1.11}F_{1.8}Cl_{2.2}$ | 1.11 | 0 | — | 1.8 | 2.2 | None | $1.1 \times 10^{-4}$ |
| Example 15 | $Li_{0.67}Al_{1.11}F_{1.8}Cl_{2.2}$ | 1.11 | 0 | — | 1.8 | 2.2 | Performed | $2.6 \times 10^{-4}$ |
| Example 16 | $Li_{0.61}Al_{1.13}F_{1.6}Cl_{2.4}$ | 1.13 | 0 | — | 1.6 | 2.4 | Performed | $2.5 \times 10^{-4}$ |
| Example 17 | $Li_{0.58}Al_{1.14}F_{1.8}Cl_{2.2}$ | 1.14 | 0 | — | 1.8 | 2.2 | None | $1.0 \times 10^{-4}$ |
| Example 18 | $Li_{0.49}Al_{1.17}F_{1.6}Cl_{2.4}$ | 1.17 | 0 | — | 1.6 | 2.4 | Performed | $1.6 \times 10^{-4}$ |
| Example 19 | $Li_{0.49}Al_{1.17}F_{1.9}Cl_{2.1}$ | 1.17 | 0 | — | 1.9 | 2.1 | None | $9.8 \times 10^{-5}$ |
| Example 20 | $Li_{0.4}Al_{1.2}F_{1.6}Cl_{2.4}$ | 1.2 | 0 | — | 1.6 | 2.4 | Performed | $1.1 \times 10^{-4}$ |
| Example 21 | $Li_{0.4}Al_{1.2}F_{1.9}Cl_{2.1}$ | 1.2 | 0 | — | 1.9 | 2.1 | None | $9.8 \times 10^{-5}$ |
| Example 22 | $Li_{0.31}Al_{1.23}F_{1.6}Cl_{2.4}$ | 1.23 | 0 | — | 1.6 | 2.4 | None | $9.8 \times 10^{-5}$ |
| Example 23 | $Li_{0.31}Al_{1.23}F_{1.6}Cl_{2.4}$ | 1.23 | 0 | — | 1.6 | 2.4 | Performed | $5.6 \times 10^{-5}$ |
| Example 24 | $Li_{0.25}Al_{1.25}F_2Cl_2$ | 1.25 | 0 | — | 2 | 2 | None | $4.4 \times 10^{-5}$ |
| Example 25 | $LiAlF_{1.4}Br_{2.6}$ | 1 | 0 | — | 1.4 | 0 | None | $2.7 \times 10^{-5}$ |
| Example 26 | $LiAlF_{1.6}Br_{2.4}$ | 1 | 0 | — | 1.6 | 0 | None | $4.2 \times 10^{-5}$ |
| Example 27 | $LiAlF_{1.8}Br_{2.2}$ | 1 | 0 | — | 1.8 | 0 | None | $3.1 \times 10^{-5}$ |
| Example 28 | $LiAlF_2Br_2$ | 1 | 0 | — | 2 | 0 | None | $2.8 \times 10^{-5}$ |
| Example 29 | $Li_{0.67}Al_{1.11}F_{1.8}Br_{2.2}$ | 1.11 | 0 | — | 1.8 | 0 | None | $3.3 \times 10^{-5}$ |
| Example 30 | $Li_{0.67}Al_{1.11}F_{1.8}Cl_{1.8}Br_{0.4}$ | 1.11 | 0 | — | 1.8 | 1.8 | None | $6.7 \times 10^{-5}$ |
| Example 31 | $Li_{0.67}Al_{1.11}F_{1.8}Cl_{1.3}Br_{0.9}$ | 1.11 | 0 | — | 1.8 | 1.3 | None | $5.8 \times 10^{-5}$ |
| Example 32 | $Li_{0.67}Al_{1.11}F_{1.8}Cl_2Br_{0.2}$ | 1.11 | 0 | — | 1.8 | 2 | None | $6.7 \times 10^{-5}$ |

TABLE 2

|  | Composition | a | b | c | x | y | Heat treatment | Ionic conductivity (S/cm) |
|---|---|---|---|---|---|---|---|---|
| Example 33 | $Li_{1.02}Al_{0.98}Mg_{0.02}F_{1.6}Cl_{2.4}$ | 0.98 | 0.02 | 2 | 1.6 | 2.4 | None | $8.7 \times 10^{-5}$ |
| Example 34 | $Li_{1.05}Al_{0.95}Mg_{0.05}F_{1.6}Cl_{2.4}$ | 0.95 | 0.05 | 2 | 1.6 | 2.4 | None | $9.4 \times 10^{-5}$ |
| Example 35 | $Li_{1.07}Al_{0.93}Mg_{0.07}F_{1.6}Cl_{2.4}$ | 0.93 | 0.07 | 2 | 1.6 | 2.4 | None | $9.8 \times 10^{-5}$ |
| Example 36 | $Li_{1.1}Al_{0.9}Mg_{0.1}F_{1.6}Cl_{2.4}$ | 0.9 | 0.1 | 2 | 1.6 | 2.4 | None | $8.5 \times 10^{-5}$ |
| Example 37 | $Li_{1.05}Al_{0.95}Mg_{0.05}F_{1.6}Cl_{2.4}$ | 0.95 | 0.05 | 2 | 1.6 | 2.4 | Performed | $2.4 \times 10^{-5}$ |
| Example 38 | $Li_{0.9}AlMg_{0.05}F_{1.6}Cl_{2.4}$ | 1 | 0.05 | 2 | 1.6 | 2.4 | None | $6.7 \times 10^{-5}$ |
| Example 39 | $Li_{0.6}AlMg_{0.2}F_{1.6}Cl_{2.4}$ | 1 | 0.2 | 2 | 1.6 | 2.4 | None | $5.0 \times 10^{-5}$ |
| Example 40 | $Li_{0.9}AlMg_{0.05}F_{1.6}Cl_{2.4}$ | 1 | 0.05 | 2 | 1.6 | 2.4 | Performed | $2.2 \times 10^{-5}$ |
| Example 41 | $Li_{1.05}Al_{0.95}Ca_{0.05}F_{1.6}Cl_{2.4}$ | 0.95 | 0.05 | 2 | 1.6 | 2.4 | None | $7.9 \times 10^{-5}$ |
| Example 42 | $Li_{1.1}Al_{0.9}Ca_{0.1}F_{1.6}Cl_{2.4}$ | 0.9 | 0.1 | 2 | 1.6 | 2.4 | None | $4.8 \times 10^{-5}$ |
| Example 43 | $Li_{1.05}Al_{0.95}Ca_{0.05}F_{1.6}Cl_{2.4}$ | 0.95 | 0.05 | 2 | 1.6 | 2.4 | Performed | $2.4 \times 10^{-5}$ |
| Example 44 | $Li_{0.9}AlCa_{0.05}F_{1.6}Cl_{2.4}$ | 1 | 0.05 | 2 | 1.6 | 2.4 | None | $4.7 \times 10^{-5}$ |
| Example 45 | $Li_{0.6}AlCa_{0.2}F_{1.6}Cl_{2.4}$ | 1 | 0.2 | 2 | 1.6 | 2.4 | None | $4.3 \times 10^{-5}$ |
| Example 46 | $Li_{0.9}AlCa_{0.05}F_{1.6}Cl_{2.4}$ | 1 | 0.05 | 2 | 1.6 | 2.4 | Performed | $1.8 \times 10^{-5}$ |
| Example 47 | $Li_{1.02}Al_{0.93}Zr_{0.05}F_{1.48}Cl_{2.52}$ | 0.93 | 0.05 | 4 | 1.48 | 2.52 | None | $1.2 \times 10^{-4}$ |
| Example 48 | $Li_{1.04}Al_{0.87}Zr_{0.09}F_{1.4}Cl_{2.6}$ | 0.87 | 0.09 | 4 | 1.4 | 2.6 | None | $1.6 \times 10^{-4}$ |
| Example 49 | $Li_{1.07}Al_{0.8}Zr_{0.13}F_{1.3}Cl_{2.7}$ | 0.8 | 0.13 | 4 | 1.3 | 2.7 | None | $1.9 \times 10^{-4}$ |
| Example 50 | $Li_{1.16}Al_{0.53}Zr_{0.31}F_{0.85}Cl_{3.15}$ | 0.53 | 0.31 | 4 | 0.85 | 3.15 | None | $1.8 \times 10^{-4}$ |

TABLE 3

|  | Composition | a | b | c | x | y | Heat treatment | Ionic conductivity (S/cm) |
|---|---|---|---|---|---|---|---|---|
| Comparative Example 1 | $LiAlCl_4$ | 1 | 0 | — | 0 | 4 | None | $3.8 \times 10^{-6}$ |
| Comparative Example 2 | $LiAlBr_4$ | 1 | 0 | — | 0 | 0 | None | $8.3 \times 10^{-6}$ |
| Comparative Example 3 | $LiAlF_4$ | 1 | 0 | — | 4 | 0 | None | $1.7 \times 10^{-8}$ |

DISCUSSION

As can be seen from Tables 1 and 2, the electrolyte materials of Examples 1 to 50 had a high ionic conductivity of greater than or equal to $1\times10^{-5}$ S/cm around room temperature. In contrast, as can be seen from Table 3, the electrolyte materials of Comparative Examples 1 to 3 had an ionic conductivity of less than $1\times10^{-5}$ S/cm around room temperature.

In general, an electrolyte material in which chlorine or bromine is partially replaced by fluorine exhibits improved electrochemical stability but decreased ionic conductivity. This is because fluorine tends to strongly attract cations because of its very high electronegativity and thus tends to interfere with the conduction of lithium ions. However, the electrolyte material according to the present disclosure exhibited improved ionic conductivity through the introduction of fluorine.

As can be seen from Tables 1 and 2, the electrolyte materials that satisfied $0.4\leq x\leq 2.0$ in formula (1) had high ionic conductivity. As can be seen from a comparison of Examples 2 to 12 with Example 1, the electrolyte materials that satisfied $0.8\leq x\leq 1.8$ had higher ionic conductivity.

As can be seen from Table 2, the electrolyte materials in which M was at least one selected from the group consisting of Mg, Ca, and Zr (i.e., which satisfied $0<b<2$ in formula (1)) also had high ionic conductivity.

As can be seen from Examples 47 to 50, the electrolyte materials in which M was Zr had a high ionic conductivity of greater than or equal to $1\times10^{-4}$ S/cm.

As can be seen from Tables 1 and 2, the electrolyte materials that satisfied $1.0\leq a\leq 1.25$ in formula (1) had high ionic conductivity.

The batteries of Examples 1 to 32 were all changed and discharged at room temperature. In contrast, the batteries of Comparative Examples 1 to 3 were not charged or discharged. In addition, the electrolyte materials of Examples 1 to 32 contain no sulfur and therefore generate no hydrogen sulfide.

As discussed above, the electrolyte material according to the present disclosure is a material that generates no hydrogen sulfide and that has high lithium ion conductivity. The electrolyte material according to the present disclosure is suitable for providing a battery that can be successfully charged and discharged.

The electrolyte material according to the present disclosure is used in, for example, an all-solid lithium ion secondary battery.

What is claimed is:

1. An electrolyte material represented by the following compositional formula (1):

   (1)

wherein M is at least one selected from the group consisting of Mg, Ca, and Zr,
c represents a valence of M, and
all the following inequalities are satisfied:
0<a<1.33,
0<b<2,
1.3≤x≤2.0,
0≤y<4, and
(x+y)≤4.

2. The electrolyte material according to claim 1, wherein 1≤a≤1.25 is satisfied.

3. The electrolyte material according to claim 1, wherein 1≤a≤1.2 is satisfied.

4. The electrolyte material according to claim 1, wherein the electrolyte material is in a form of powder, particles, pellets or a plate.

5. An electrolyte material represented by the following compositional formula (1):

   (1)

wherein M is at least one selected from the group consisting of Mg, Ca, and Zr,
c represents a valence of M,
all the following inequalities are satisfied:
0<a<1.33,
0≤b<2,
1.3≤x≤2.0,
0≤y<4, and
(x+y)≤4, and
the electrolyte material is in a form of powder, particles or pellets.

6. The electrolyte material according to claim 5, wherein 1≤a≤1.25 is satisfied.

7. The electrolyte material according to claim 6, wherein 1≤a≤1.2 is satisfied.

8. A battery comprising:
a positive electrode;
a negative electrode; and
an electrolyte layer disposed between the positive electrode and the negative electrode,
wherein at least one selected from the group consisting of the positive electrode, the negative electrode, and the electrolyte layer contains an electrolyte material represented by the following compositional formula (1):

   (1)

wherein M is at least one selected from the group consisting of Mg, Ca, and Zr,
c represents a valence of M,
all the following inequalities are satisfied:
0<a<1.33,
0≤b<2,
1.3≤x≤2.0,
0≤y<4, and
(x+y)≤4, and
the electrolyte material is in a form of particles.

9. The battery according to claim 8, wherein the electrolyte layer contains a nonaqueous electrolyte solution containing the electrolyte material.

10. The battery according to claim 8, wherein the particles have a median size of greater than or equal to 0.1 μm and less than or equal to 100 μm.

* * * * *